April 12, 1966     J. H. EAGLE ET AL     3,245,333
CAMERA

Original Filed Sept. 30, 1959

John H. Eagle
Hubert Nerwin
INVENTORS

BY
ATTORNEYS

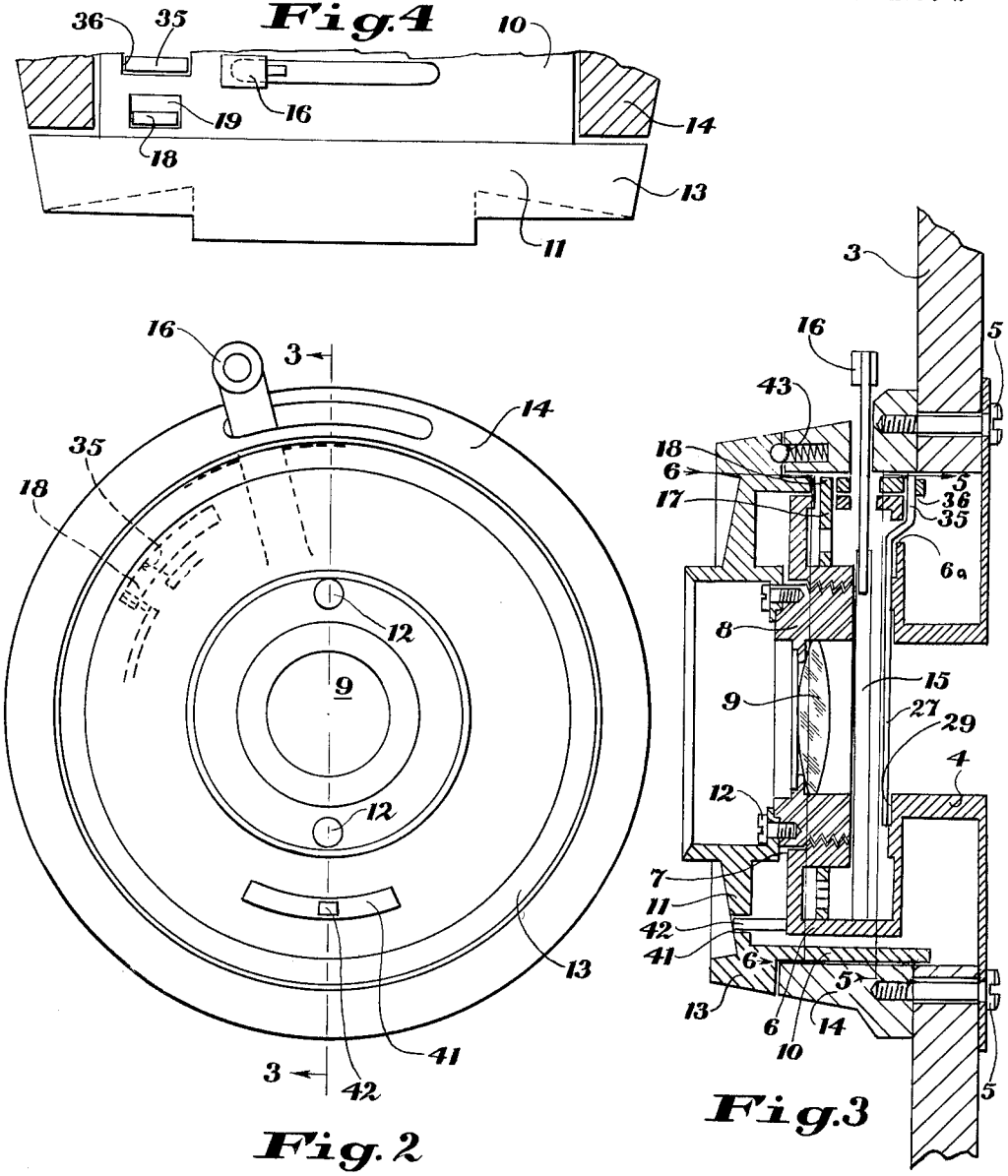

April 12, 1966    J. H. EAGLE ET AL    3,245,333
CAMERA
Original Filed Sept. 30, 1959    3 Sheets-Sheet 3

John H. Eagle
Hubert Nerwin
INVENTORS

BY
ATTORNEYS

United States Patent Office 3,245,333
Patented Apr. 12, 1966

3,245,333
CAMERA
John H. Eagle and Hubert Nerwin, Rochester, N.Y., assignors to Eastman Kodak Company, Rochester, N.Y., a corporation of New Jersey
Continuation of application Ser. No. 843,441, Sept. 30, 1959. This application Oct. 30, 1963, Ser. No. 320,956
7 Claims. (Cl. 95—64)

This application is a continuation of application Serial No. 843,441, filed September 30, 1959, now abandoned.

This invention relates generally to cameras, and more specifically to an improved camera adapted to take satisfactorily exposed pictures over a predetermined exposure range of illumination and having at least two exposure settings, each adapted to cover separate, specific portions of the predetermined exposure range.

Efforts are constantly being made to develop an inexpensive camera adapted to produce satisfactorily exposed pictures over a wide exposure range of illumination without requiring individually operated focus, exposure time and diaphragm setting levers, or the need for expensive auxiliary equipment such as light meters. With the advent of ultra-high-speed film, it is possible for an operator with a more expensive type camera to take satisfactorily exposed pictures covering a wide exposure range provided the operator properly selects the exposure time and diaphragm setting values. Unless the operator is a relatively skilled photographer, it is difficult to achieve satisfactorily exposed pictures over this entire exposure range. The ordinary box camera which is inexpensive and extremely simple to operate is adapted when using ultra-high-speed film of an ASA rating of 1600 to produce satisfactorily exposed pictures over an exposure range of approximately 85 to 6000 foot-candles of illumination, assuming that a satisfactorily exposed picture will result with an underexposure of 1½ diaphragm or $f$ stops and an overexposure of 4 $f$ stops from an ideally selected $f$ reading. The lower limit of 85 foot-candles of illumination is comparable to a scene brightness level existing during sunsets or on rainy days. Applicants' improved camera combines the features of the inexpensive box camera and the expensive still camera to provide an inexpensive still camera of extreme simplicity; having only one setting knob or lever movable from an "indoor or very low-light" setting to an "outdoor or high-light" setting to produce satisfactorily exposed pictures over an exposure range of approximately 1.2 to 6000 foot-candles of illumination. This would permit the taking of satisfactorily exposed pictures at a scene-brightness level existing at night in a business district, average living room or theater district without any added auxiliary or artificial light over and above the ligh normally existing in these areas.

Therefore, one of the primary objects of this invention is to provide an improved still camera adapted to produce satisfactorily exposed pictures over a wide exposure range of illumination.

Another object of this invention is the provision of an improved still camera that is of simple design and construction, thoroughly reliable and efficient in operation, and economical to manufacture.

Another object of the invention is to provide a camera having a control member which when moved in one direction simultaneously increases both the exposure time and the size of the exposure aperture to admit a predetermined amount of illumination to the film to take satisfactorily exposed pictures over a portion of a predetermined range of illumination, and when moved in the opposite direction simultaneously decreases both the exposure time and exposure aperture to admit an appreciably different amount of illumination to the film to take satisfactorily exposed pictures over the remaining portion of the predetermined exposure range.

Still another object of this invention is to provide an improved inexpensive still camera adapted to take satisfactorily exposed pictures over a predetermined exposure range of illumination, and having only one setting member movable between two exposure positions, each adapted to cover separate, specific portions of the predetermined exposure range.

Objects and advantages other than those set forth above will be apparent from the following description when read in connection with the accompanying drawings, in which:

FIG. 2 is an enlarged elevation view of a portion of the camera of FIG. 1;

FIG. 3 is a section view taken substantially on line 3—3 of FIG. 2;

FIG. 4 is a top plan view of the camera structure of FIG. 2 with a portion thereof in section;

Figure 1:
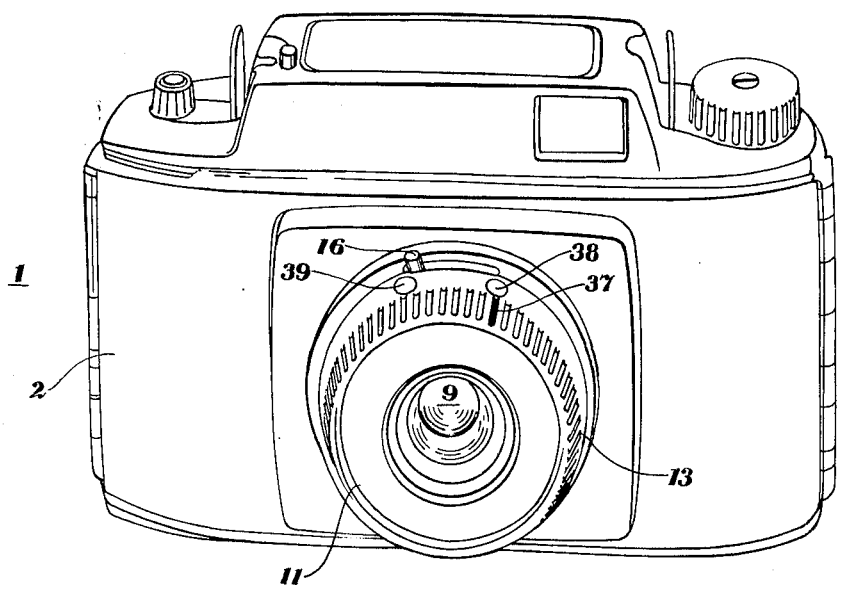
FIG. 1 is a perspective view of a camera in which a preferred embodiment of this invention is incorporated.

As shown in the drawings, the invention is embodied in a still camera 1 of any known type, having a body 2 for housing a light-sensitive film which is adapted to be transported a frame at a time across the focal plane of the optical system of camera 1. Since the film transport mechanism for camera 1 and any related apparatus such as a double-exposure prevention device, do not form a part of the invention, they will only be referred to generally, it being well understood that any well-known apparatus of this type may be employed.

As seen greatly enlarged in FIG. 3, a front frame member 3 of camera body 2 supports an annular lens mount support bracket 4 which is secured thereto by screws 5. The bracket 4 has an annular projection 6 internally threaded at 7 to receive a threaded lens mount 8 carrying a lens 9 of known type. A knob shown as an annular setting member 11 is secured to lens mount 8 by screws 12 and is movable between first and second positions to be explained in greater detail hereinafter. As member 11 is moved between these positions, lens mount 8 is moved axially for varying its focus from one position to another position, in this instance from 7 feet to 13 feet although any other two distances may be selected. Setting member 11 further has a peripheral rim provided with a series of alternate ridges and depressions as seen in FIG. 1 to facilitate turning of member 11 by the operator. An annular ring 14 is interposed between rim 13 and plate 3 and secured to frame member 3 by screws 5 for enclosing annular projection 10 formed by setting member 11, primarily for continuing the lines of setting member 11 for the aesthetic and artistic appearance that is achieved.

Figures 5, 6:
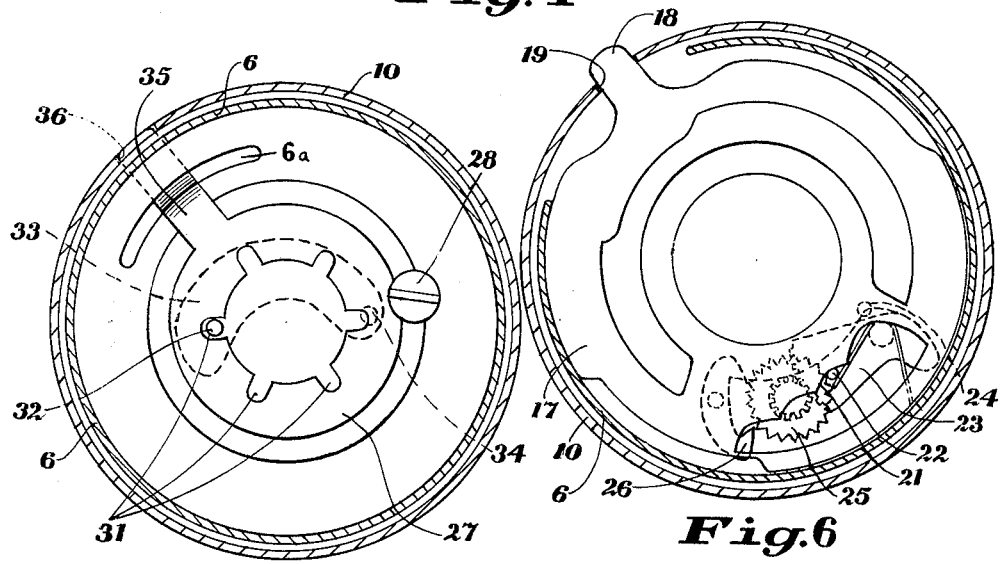
FIG. 5 is a section view taken substantially on line 5—5 of FIG. 3 and showing the diaphragm structure in greater detail.
FIG. 6 is a section view which is not in scale taken substantially along line 6—6 of FIG. 3 and showing the exposure timing mechanism enlarged and in greater detail.

A shutter of any known type adapted to prevent light from passing therethrough to expose the film is shown diagrammatically at 15 and is rigidly secured to projection 6. The shutter 15 has a cocking lever 16 extending through slots in projection 6, member 11 and ring 14, and is adapted when moved to tension or cock shutter 15. The shutter blades, not shown, of the shutter are normally in a closed position, and when shutter 15 is released by any known means, such as the depression of a shutter button, the shutter blades are driven to an open position and then back to the closed position to complete the exposure. The duration of the exposure is controlled by any well-known type of shutter timing mechanism such as shown in FIG. 6. A disk 17 is rotatably supported by projection 6 and is rotatably driven by a finger 18 formed on disk 17 and received by a slot 19 in projection 10. As setting member 11 is turned by the operator, disk 17 is carried therealong causing cam portion 21 formed thereby to engage a pin 22 carried by a spring-biased gear segment 23 of a time delay mechanism. This positions segment 23 with a greater or lesser portion thereof in the path of a shutter run-down pin 24, shown dotted. As the shutter runs down, pin 24 engages segment 23 and pivots it out of the way and then terminates the exposure. The segment 23, as it is pivoted, drives a retard mechanism including a gear 25 and ratchet 26 for further controlling the exposure delay. It is readily apparent that by varying the position of segment 23 by means of cam 21, the shutter exposure time may be varied. The cam 21 has been designed in this instance along with the delay mechanism to provide only two exposure speeds, one of $\frac{1}{40}$ second duration and the other of $\frac{1}{100}$ second duration.

The diaphragm mechanism for controlling the camera aperture may be of a well known type and as best shown in FIG. 5 may comprise an annular disk 27 confined by screw 28 for rotation within a circular recess 29 (see FIG. 3) formed in bracket 6. The inner periphery of disk 27 is provided with radial slots 31 each adapted to receive a pin 32 carried by one end of a diaphragm blade 33, only one of which is shown dotted and pivoted at 34. The disk 27 is further provided with a finger 35 received by a slot 36 formed in the annular projection 10. An elongated slot 6a is provided in the stationary projection 6 (see FIGS. 3 and 5) to permit rotation of the finger 35. It is readily apparent that when setting member 11 is turned, disk 27 is carried thereby for moving diaphragm blades 33 and varying the camera aperture.

As seen in FIG. 1, setting member 11 is movable between a first position with an index 37 on rim 13 in register with a mark 38 on ring 14, and a second position with index 37 in alignment with another mark 39 on ring 14. The setting member 11 is provided with a slot 41 shown in FIG. 2 for receiving a stop lug 42 carried by projection 6 to limit movement of setting member 11 between its two positions. A spring loaded detent 43 carried by ring 14 cooperates with one of two recesses formed by setting member 11 for releasably holding setting member 11 in one of the two positions as seen in FIG. 3. As setting member 11 is moved from one position to the other, the focus position diaphragm setting and exposure time setting are all changed as indicated heretofore, and are all specifically designed to be changed from one specific set of values to a different specific set of values.

The lens mount 8, diaphragm mechanism, and exposure timing device which are all under the control of setting member 11 are properly adjusted with respect to member 14 so that in the "indoor" position of setting member 11, the lens mount 8 is positioned to provide a focus of 7 feet since most of the exposure under this setting would normally be taken at distances of 5 to 10 feet. In this "indoor" position, the diaphragm is set at an $f/4$ reading and the exposure time at $\frac{1}{40}$ second. Using the following formula $$\text{Ft. c.} = \frac{22 f^2}{2.5 T \text{ (ASA)}}$$

Where $f$ is the diaphragm reading, $T$ is the exposure time in seconds, ASA is the film speed rating of 1600, and 2.5 is the safety factor inherent in ASA ratings, the foot-candles (ft. c.) of illumination for proper or ideal exposure at the selected exposure setting is found to be approximately 3.5. Assuming that a satisfactorily exposed picture will result with an underexposure of one and a half $f$ stops are arranged in the following progression—1, 1.4, 2, 2.8, 4, 5.6, 8, 11, 16, 32 etc., with the 1 stop indicating maximum light, the next stop or 1.4 indicating ½ as much light admitted than at the 1 stop, the next stop or 2 stop indicating ¼ as much light admitted than at the 1 stop, etc., this would be the equivalent of an illumination of ⅓ of the illumination for ideal exposure of 3.5 or approximately 1.2 ft. c. Also, assuming an overexposure of four and a half $f$-stops will result in satisfactorily exposed pictures, this means that 24 times as much light as that required for an ideal exposure would be permissible, or approximately 85 ft. c. of illumination. It is therefore apparent that with the setting of $f/4$, $\frac{1}{40}$ second, a satisfactorily exposed picture may be achieved over an exposure range of approximately 1.2 to 85 foot-candles of illumination as shown graphically in FIGS. 7 and 8. Moving setting member 11 to the "outdoor" position axially moves lens mount 8 to a new position providing a focus of 13 ft. This increased focal distance is advantageous since the majority of exposures made at the "outdoor" setting would be of outdoor scenes of subjects varying from 10 feet to infinity. It should be noted that although applicants choose to vary the focus from one position to the other, it is clearly within the scope of the invention to position lens 8 at a fixed focal distance for both settings, and have setting member 11 rotatable with respect to the lens mount. In this "outdoor" position, the diaphragm mechanism is designed to be moved thereby from the $f/4$ reading to an $f/22$ reading, and the shutter-timing device is set for an exposure time of $\frac{1}{100}$ sec. Once again, the foot-candles of illumination required for an ideal exposure is computed by the above-indicated formula to be approximately 250. Also, assuming that an underexposure of one and a half $f$ stops, and an overexposure of four and a half $f$ stops is permissible, the camera at this setting will take a satisfactorily exposed picture over an exposure range of approximately 85 to 6000 foot-candles of illumination.

Figure 7:
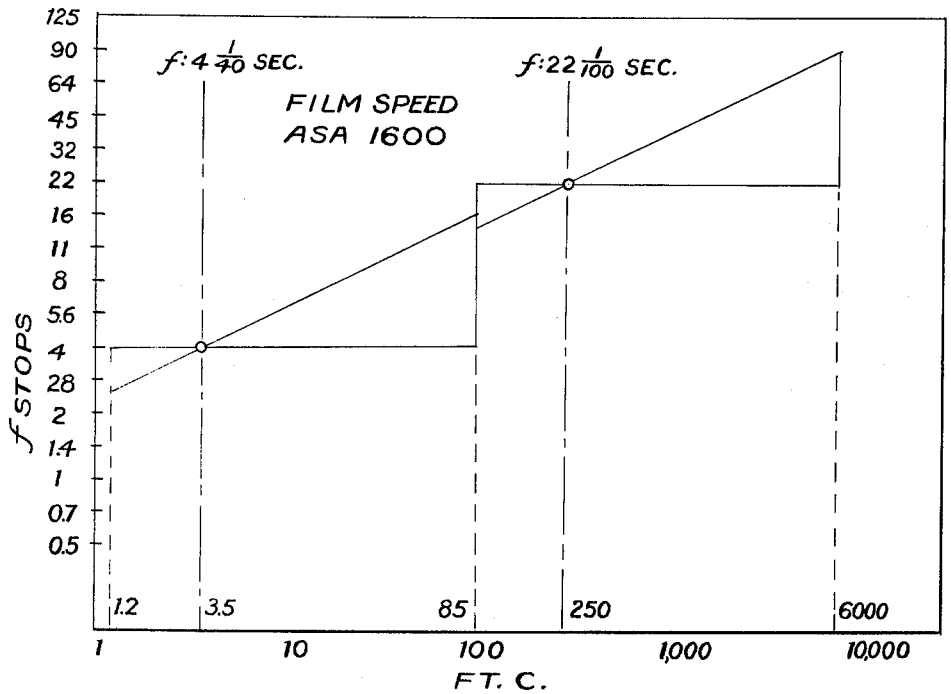
FIG. 7 is a graph of diaphragm values ($f$-reading) versus illumination in foot-candles, showing how the proper selection of two exposure settings with the use of a film having an ASA speed rating of 1600 will result in the production of satisfactorily exposed pictures over an exposure range of approximately 1.2 to 6000 foot-candles of illumination.
Figure 8:
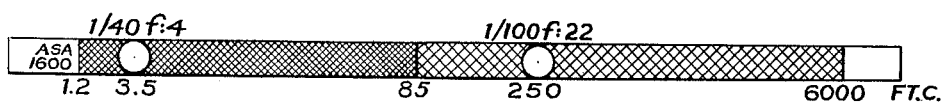
FIG. 8 is a chart showing the exposure range in foot-candles covered by two exposure settings for a specified type of film.
Figure 9:
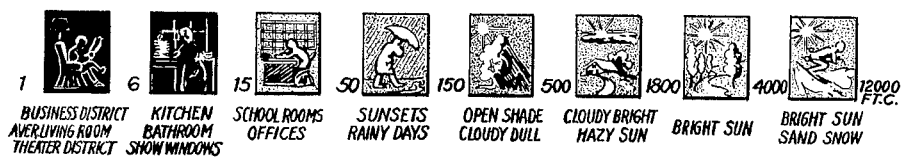
FIG. 9 is an exposure chart showing an exposure range of 1 to 12,000 foot-candles of illumination and some of the representative types of scenes existing between various ranges of illumination.

It is clear, that by properly selecting the "indoor" and "outdoor" exposure settings, it is possible as seen in FIGS. 7 and 8 to take satisfactorily exposed pictures with camera 1 over an exposure range of approximately 1.2 to 6000 foot-candles of illumination using a film with an ASA rating of 1600, or an exposure index of 4000 (computed by multiplying the safety factor 2.5 by the ASA rating of 1600). As seen in FIG. 9, this would result in achieving satisfactorily exposed pictures taken at a scene brightness level existing at night in an average living room, business district, and theater district without the need of artificial light over and above the normal light existing in these areas. The camera 1 would also be able to take satisfactorily exposed pictures at a scene brightness level existing on a bright sunny day. Although applicants used a diaphragm reading of $f/4$ and exposure time of $\frac{1}{40}$ second at one setting, and a diaphragm reading of $f/22$ and exposure time of $\frac{1}{100}$ second at the other setting, it is conceivable that other combinations of diaphragm settings and exposure times can be used to accomplish the same results. For instance, a diaphragm setting of $f/15$ and exposure time of $\frac{1}{200}$ sec. will cover substantially the same exposure range of 84 to 6000 ft. c. illumination covered by applicants' diaphragm setting of $f/22$ and exposure time of $\frac{1}{100}$ sec.

The invention has been described in detail with particular reference to preferred embodiments thereof, but it will be understood that variations and modifications can be effected within the spirit and scope of the invention as described hereinabove and as defined in the appended claims.

We claim:

1. In a camera for taking satisfactorily exposed pictures over a predetermined exposure range of illumination and having an exposure aperture through which light is admitted to expose a photosensitive surface and means for focusing an image on the photosensitive surface, the combination comprising: a shutter adapted when operated to open and close to make an exposure; an exposure time setting mechanism for said shutter to control the exposure time by adjusting the time during which said shutter is open during operation thereof; diaphragm means defining the exposure aperture; an adjusable diaphragm mechanism for said diaphragm means for varying the size of the aperture; and control means including a control member associated with said shutter exposure time setting and diaphragm mechanisms for adjustably moving both mechanisms simultaneously, said control member being movable in one direction to increase both the exposure time and the size of the exposure aperture, and in the opposite direction to decrease both the exposure time and the size of the exposure aperture, said control member further being movable between a first position in which said mechanisms are adjusted to admit a predetermined amount of illumination to the film to take satisfactorily exposed pictures over a portion of said predetermined exposure range of illumination upon operation of said shutter, and a second position in which said mechanisms are adjusted to admit an appreciably different amount of illumination to the film to take satisfactorily exposed pictures over the remaining portion of said predetermined exposure range upon operation of said shutter.

2. The invention according to claim 1 wherein said control means is mechanically connected to said shutter exposure time setting and diaphragm mechanisms.

3. The invention according to claim 2 wherein said mechanical connection comprises projections provided by said mechanisms engageable by said control member of said control means.

4. The invention according to claim 1 wherein said camera is further provided with a focusing mechanism associated with said control means and adjustable thereby.

5. The invention according to claim 4 wherein said focusing mechanism comprises an axially movable lens mount mechanically connected to said control member of said control means.

6. The invention according to claim 5 wherein said control member is fixedly mounted to said lens mount.

7. The invention according to claim 1 wherein said camera is further provided with a focusing mechanism, and said control member comprises a rotatable knob fixedly secured to said focusing mechanism, said knob further having slots for receiving projections provided by said shutter exposure time setting and diaphragm adjusting mechanisms.

References Cited by the Examiner
UNITED STATES PATENTS 2,837,986    6/1958    Perlin _____ 95—64 X

OTHER REFERENCES

German application Z 4899 IX/57a, March 1956.

NORTON ANSHER, *Primary Examiner*.